July 17, 1928.
A. A. SCHAEFER
1,677,690
DEVICE FOR TESTING LUBRICATING OILS
Filed Dec. 12, 1921
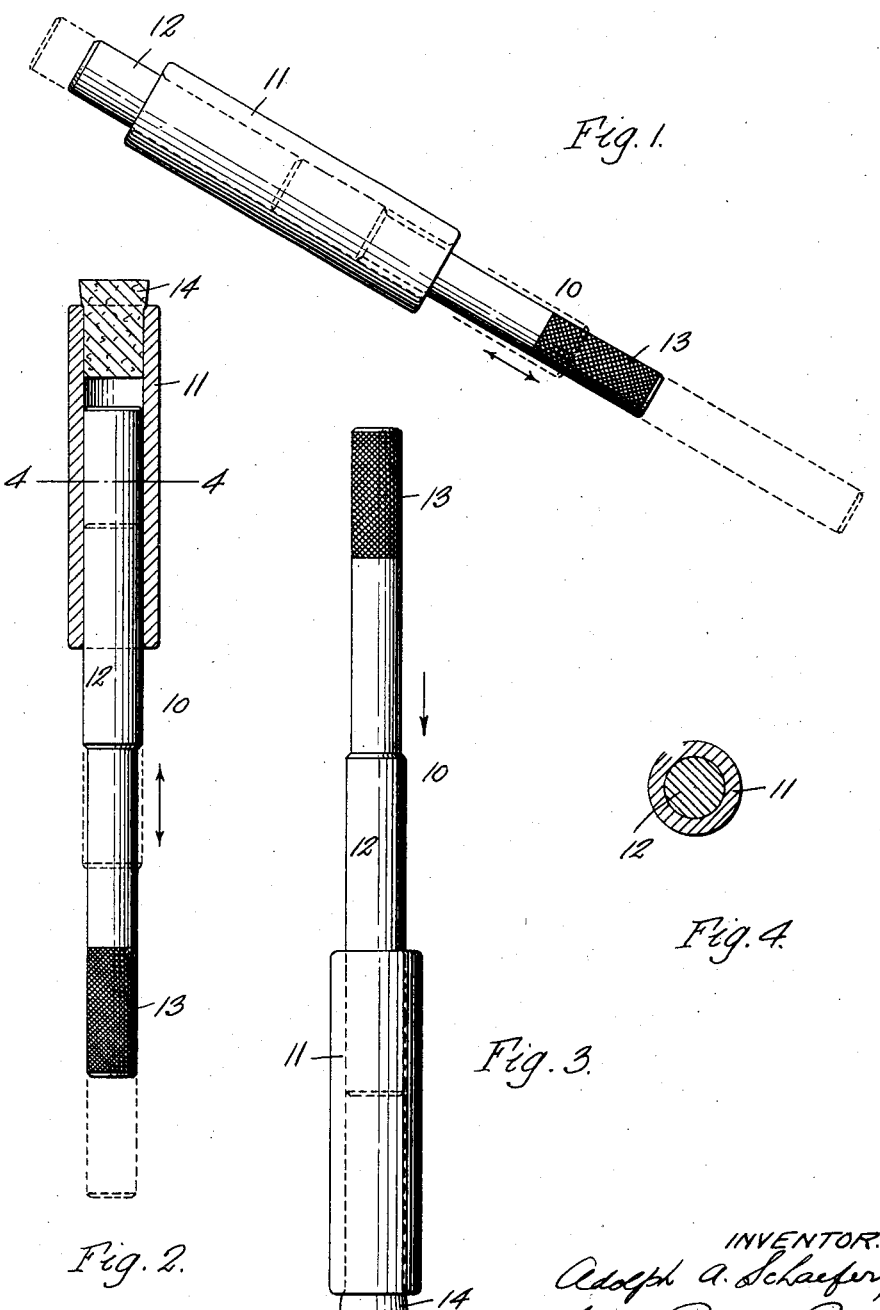

Patented July 17, 1928.

1,677,690

UNITED STATES PATENT OFFICE.

ADOLPH A. SCHAEFER, OF BUFFALO, NEW YORK, ASSIGNOR TO FRONTIER MANUFACTURING COMPANY, OF NORTH TONAWANDA, NEW YORK.

DEVICE FOR TESTING LUBRICATING OILS.

Application filed December 12, 1921. Serial No. 521,688.

This invention relates to methods of and devices for treating and demonstrating the properties of lubricating oils and the like.

Heretofore various methods have been used and proposed for testing and determining the viscosity of oils as well as their flash points and the like, such methods requiring more or less expensive and complicated devices or apparatus and expert knowledge and manipulation.

The objects of the present invention are to provide a simple and effective method of and device for determining and demonstrating the relative viscosity of different lubricating oils and the relative frictional resistances between parts to which the oils are applied; also to provide an improved method of and means for determining and demonstrating the adhesive qualities of lubricating oils; and also to provide an improved method of and means for determining and demonstrating the sealing qualities or properties of lubricating oils. Further objects are to provide a device for determining and demonstrating such properties in a manner to be easily understood and requiring no expert knowledge or skill to operate and understand; and to provide means for demonstrating the properties of lubricating oils when used, for example, in the oiling systems of internal combustion engines or the like.

In the accompanying drawings:

Fig. 1 is a side elevation of a device embodying the invention.

Fig. 2 is a sectional elevation thereof.

Fig. 3 is a side elevation thereof.

Fig. 4 is a section on line 4—4, Fig. 2.

According to the invention, there are provided two relatively movable parts preferably of material similar to the material of the parts of the machine on which the oil is to be used. These parts are preferably of a size and form to be readily manipulated by hand and when a sample or film of oil is applied to the contact surface of one of the parts, and the contact surface of the other part moved or rubbed thereon, the frictional resistance between the parts can be felt and gaged by the operator. In this manner with one or more devices, a test and demonstration of the frictional resistance properties of different lubricating oils may be made and readily appreciated and understood by an unskilled operator.

In the drawing there is shown a device adapted to carry out this invention and consisting of a plunger 10 which moves in a tube or cylinder 11. The plunger 10 has a portion 12 of uniform diameter and preferably formed of suitable metal to freely slide in the tube or cylinder 11. The contacting surfaces of the plunger 10 and the tube 11 are preferably smooth and the plunger is furthermore preferably provided with a handle 13. To make the frictional resistance test referred to hereinabove, a small quantity of oil is placed on the portion 12 of the plunger, the tube 11 is held in one hand and the handle 13 of plunger 10 is grasped by the other hand of the operator, and the plunger is reciprocated in the cylinder, as illustrated in Fig. 1 of the drawings. By using two or more of these devices in connection with different grades or types of oils, the relative frictional resistances between the working parts may be readily determined and noted, or one device may be used for testing several oils, after one oil has been tested, the plunger being cleaned or wiped before receiving the other oils.

A further frictional resistance test may be made by turning or rotating the plunger 10 about its axis in the tube 11.

In order to demonstrate the properties or qualities of the oils under different conditions of usage, as for example, in the cylinders of internal combustion engines, means are provided for closing and sealing one end of the tube or cylinder when desired. This may be done by any suitable means, such as a valve, part or member which will close the end of the tube to the atmosphere when desired. In the embodiment illustrated, a plug 14, preferably of suitable resilient material, is provided, which plug is adapted to be inserted in an end of the tube to seal it, as shown in Fig. 2 of the drawing. The plunger, upon which a small quantity of the oil to be tested has been placed, is then inserted in the open end of the tube and upon forcing the plunger into the tube, the sealing effect and properties of the oils, as well as the elasticity of the oil seal on the compression stroke of the piston, may be observed. The sealing effect of the oils and the elasticity and the resiliency of the oil seals may also be noted and observed by attempting to withdraw the plunger from the tube, thus demonstrating the frictional resistance and the resiliency and elasticity of the oil seal under a vacuum. These operations are carried out as set forth hereinabove for the frictional resistance test, that is by grasping the cylinder in one hand and by manipulating the plunger with the other hand.

A further test to demonstrate the adhesive properties of the oils and the sealing effect may be made by standing the tube upright on its closed end and placing the oil coated end of the plunger in the open end of the tube, as shown in Fig. 3. In this test, no pressure is applied to the plunger or the handle end of the plunger, and by noting the rate of speed at which the plunger lowers of its own weight in the tube, the adhesive properties of the oils and the sealing effect produced thereby may be readily noted.

The methods and device described permit of the viscuous, elastic, sealing and other properties of an oil being readily understood and appreciated by unskilled purchasers or users of the oil, and provide a most simple, ready and easily understandable means of demonstrating such properties. The device illustrated is simple and strong and contains no delicate parts or adjustments to get out of order. It may be readily carried about from place to place and the different resistances and elasticity attendant upon the use of different lubricating oils are clearly and forcibly impressed upon the operator as the device is manipulated.

I claim as my invention:

1. A portable, hand operated device for testing and comparing the properties of oils and various lubricants, comprising a cylindrical tube having a smooth bore, a piston having a smooth surface closely fitting the bore of the tube and freely slidable endwise into and out of the bore to various extents from one end thereof, whereby when a coating of the sample of the lubricant to be tested is interposed between the contacting movable surfaces of the piston and tube bore, the opposition offered to the relative movement of the piston and tube will serve as a relative indication of the quality of the lubricant, and means by which the other end of the tube may be closed or opened to atmosphere, as desired, whereby the relative sealing quality of the lubricant will be indicated by the resistance offered to the piston by the air trapped in the closed end of the tube.

2. A portable, hand operated device for testing and comparing the properties of oils and various lubricants, comprising a cylindrical tube having a smooth bore, a piston having a smooth surface closely fitting the bore of the tube and freely slidable endwise into and out of the bore to various extents from one end thereof, whereby when a coating of the sample of the lubricant to be tested is interposed between the contacting movable surfaces of the piston and tube bore, the opposition offered to the relative movement of the piston and tube will serve as a relative indication of the quality of the lubricant, and a plug removably fitting the other end of said tube to enable the selective opening or closing of that end of the tube to atmosphere, whereby the relative sealing quality of the lubricant will be indicated by the resistance offered to the piston by the air trapped in the closed end of the tube.

ADOLPH A. SCHAEFER.